(12) United States Patent
Biancalana et al.

(10) Patent No.: US 11,325,663 B2
(45) Date of Patent: May 10, 2022

(54) CAR PROVIDED WITH A REAR SPOILER AND WITH AERODYNAMIC ELEMENTS TO INCREASE THE AERODYNAMIC EFFICIENCY OF THE REAR SPOILER

(71) Applicant: FERRARI S.p.A., Modena (IT)

(72) Inventors: Matteo Biancalana, Modena (IT); Salvatore Sedda, Modena (IT)

(73) Assignee: FERRARI S.P.A., Modena (IT)

( * ) Notice: Subject to any disclaimer, the term of this patent is extended or adjusted under 35 U.S.C. 154(b) by 98 days.

(21) Appl. No.: 17/011,350

(22) Filed: Sep. 3, 2020

(65) Prior Publication Data
US 2021/0078651 A1 Mar. 18, 2021

(30) Foreign Application Priority Data

Sep. 12, 2019 (IT) .......................... 102019000016160

(51) Int. Cl.
*B62D 35/00* (2006.01)
(52) U.S. Cl.
CPC .................................. *B62D 35/007* (2013.01)
(58) Field of Classification Search
CPC ................................................... B62D 35/007
See application file for complete search history.

(56) References Cited

U.S. PATENT DOCUMENTS

| | | | | |
|---|---|---|---|---|
| 6,224,135 | B1 * | 5/2001 | Rehkopf | B60J 1/20 296/91 |
| 2003/0071485 | A1 * | 4/2003 | Kazama | B62D 35/007 296/180.1 |

FOREIGN PATENT DOCUMENTS

| | | |
|---|---|---|
| DE | 102009037746 A1 | 2/2011 |
| EP | 1632423 A1 | 8/2006 |
| EP | 3498577 A1 | 6/2019 |
| FR | 3059964 A1 | 6/2018 |
| WO | WO-2005105555 A1 * 11/2005 | ............. B62D 37/02 |

OTHER PUBLICATIONS

International Search Report issued in Italian Patent Application No. 201900016160, completed May 1, 2020; 7 pages.

* cited by examiner

*Primary Examiner* — Lori L Lyjak
(74) *Attorney, Agent, or Firm* — Cantor Colburn LLP (57) ABSTRACT

A car having: a passenger compartment; a body surrounding the passenger compartment and having: a roof, a tail provided with a rear bumper, and a joining portion connecting the 5 roof to the tail; a rear spoiler, which is arranged at the end of the joining portion in the area of the tail; and a deflector panel, which is arranged on the joining portion, is directly hit by an air flow brushing the joining portion during the travel and is mounted in a movable manner so as 10 to move between a rest position, in which the deflector panel rests on the joining portion, and an active position, in which the deflector panel is lifted and spaced apart from the joining portion.

15 Claims, 9 Drawing Sheets

CAR PROVIDED WITH A REAR SPOILER AND WITH AERODYNAMIC ELEMENTS TO INCREASE THE AERODYNAMIC EFFICIENCY OF THE REAR SPOILER

CROSS-REFERENCE TO RELATED APPLICATIONS

This patent application claims priority from Italian patent application no. 102019000016160 filed on Sep. 12, 2019, the entire disclosure of which is incorporated herein by reference.

TECHNICAL FIELD

The invention relates to a car provided with a rear spoiler.

PRIOR ART

Modern high-performance cars feature an extreme care of aerodynamics both in order to reduce the drag coefficient (also known as "CX") and in order to increase the vertical force acting upon the wheels.

In order to increase the vertical force acting upon the rear wheels, on the rear part of the body there generally is a rear spoiler (namely, a "flow deflector"), which, by deflecting the air flow caused by the movement of the car upwards, generates a downforce (namely, a downwards lift force). The rear spoiler is mounted on the third box of the body in three-box cars or on the rear window in two-box cars.

In some sports cars, the rear spoiler is replaced by a rear stabilizer, which has the same function as the rear spoiler, but is separate from the body and is connected to the body by means of suitable supports.

The downforce generated by the rear spoiler increases as the dimensions of the rear spoiler increase; however, when the dimensions of the rear spoiler increase, the drag generated by the rear spoiler increases as well.

Namely, the greater the rear spoiler, the greater the downforce (positive effect), but also the greater the drag (negative effect). Furthermore, the increase in the dimensions of the rear spoiler implies an inevitable increase in weight and size and this often also leads to aesthetic problems; indeed, the rear spoiler, for it is an element on the outside of the body, can be very striking, especially if it is large-sized.

Whether the design of the rear spoiler is good or not is generally evaluated based on the aerodynamic efficiency thereof, namely based on the ratio between the downforce generated by the rear spoiler and the corresponding drag generated by the rear spoiler; the greater this ratio, the greater the aerodynamic efficiency, namely the greater the quality of the design of the rear spoiler.

Furthermore, the action of the rear spoiler, by increasing the vertical force acting upon the rear wheels, on the one hand, allows for an improvement of performances in driving conditions in which the main need is grip (for example, while braking, during an acceleration and while driving along a bend), but, on the other hand, it worsens performances in driving conditions in which the main need is smoothness (for example, while driving along a straight road, when very high speeds need to be reached or fuel consumptions need to be optimized).

In order to obtain a great vertical force (and, hence, an unavoidably high drag) only when it is needed, a motor-driven and movable rear spoiler was suggested, which increases its angle of attack and/or comes out of its housing only under given conditions. However, the installation of a motor-driven and movable rear spoiler causes mechanical problems, besides space-related problems. In particular, the positioning of the moving members of the rear spoiler make the application of this solution particularly complicated.

Patent application FR3059964A1 describes a two-box car provided with a rear door supporting a rear spoiler arranged on the rear window; the rear spoiler comprises a plurality of openings, which are obtained through an upper wall of the rear spoiler and are coupled to respective ducts, which lead through a lower wall of the rear spoiler in order to guide an air flow towards the rear window.

DESCRIPTION OF THE INVENTION

The object of the invention is to provide a car provided with a rear spoiler, wherein the spoiler has a high aerodynamic efficiency and, at the same time, is easy and economic to be manufactured.

According to the invention, there is provided a car provided with a rear spoiler according to the appended claims.

The appended claims describe preferred embodiments of the invention and form an integral part of the description.

BRIEF DESCRIPTION OF THE DRAWINGS

The invention will now be described with reference to the accompanying drawings, showing a non-limiting embodiment thereof, wherein.

PREFERRED EMBODIMENTS OF THE INVENTION

Figure 1:
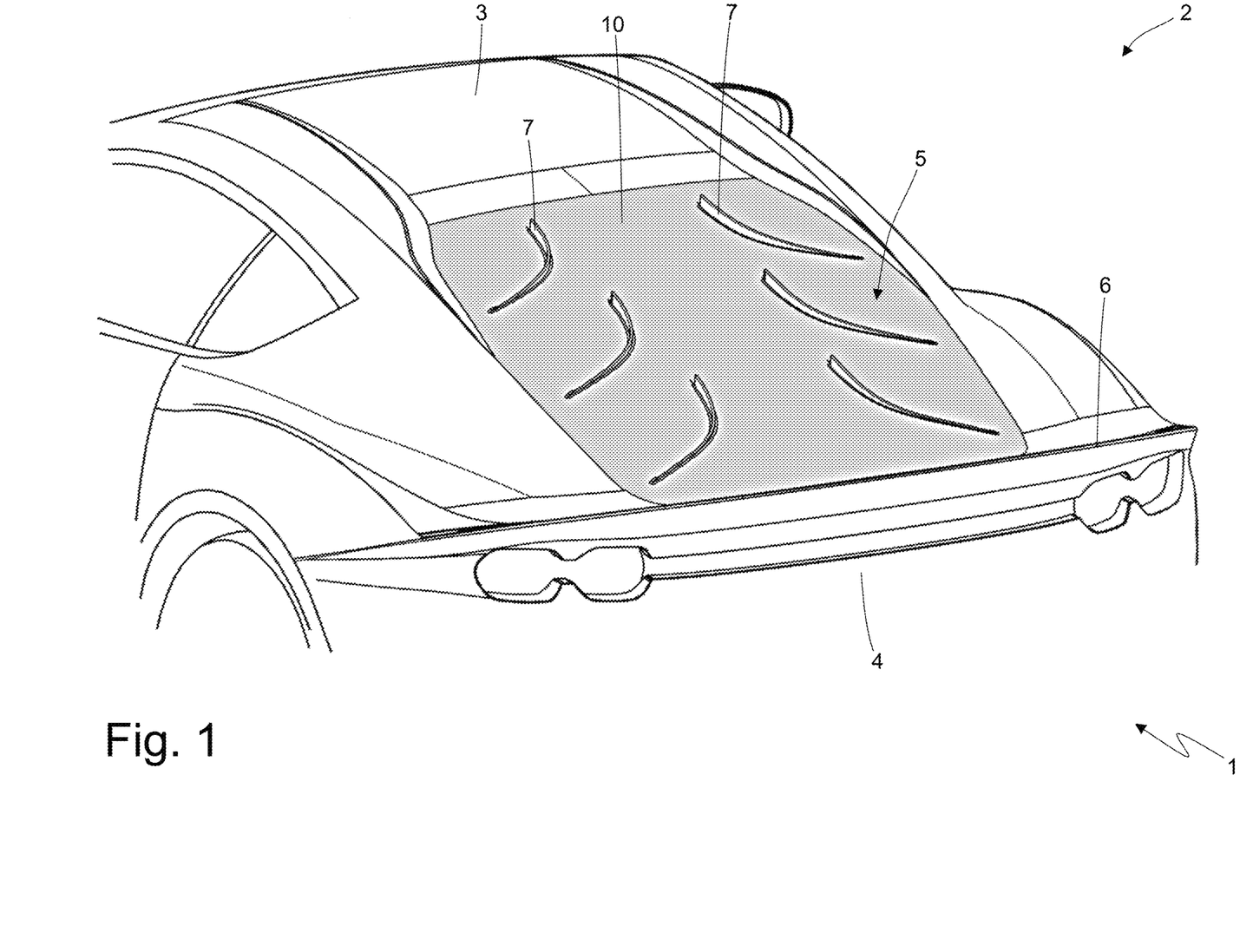
FIG. 1 is a perspective rear view of a car provided with a rear spoiler according to the invention.

In FIG. 1, number 1 indicates, as a whole, a car provided with an internal combustion engine and/or with one or more electric motors.

The car 1 comprises two front wheels (not shown herein), which are driven or caused to be drive wheels by electric motors and two rear wheels, which always are drive wheels as they receive the motion from the internal combustion engine and/or from one or more electric motors.

Furthermore, the car 1 comprises a two-seat passenger compartment, which is designed to accommodate the driver and a possible passenger, and a body 2, which surrounds the passenger compartment.

The body 2 comprises, among others, a front (not shown herein) provided with a front bumper, a front hood (not shown herein), which originates from the front and develops towards the passenger compartment, a roof 3, which covers the passenger compartment at the top, a tail 4 provided with a rear bumper, and a joining portion 5 (also called "blind rear window", since it not transparent), which connects the roof 3 to the tail 4 and progressively slopes downwards.

On the sides, the body 2 has two body sides, which are provided with respective doors.

The car 1 comprises a rear spoiler 6 (namely, a "flow deflector"), which is arranged at the end of the joining portion 5 in the area of the tail 4; the function of the rear spoiler 6 is that of increasing the vertical force acting upon the rear wheels by means of a downwards lift force (namely, a downforce), which is generated when the air flow caused by the movement of the car 1 is deflected upwards.

The car 1 comprises a plurality of projecting aerodynamic elements 7 protruding from the joining portion 5 in order to intercept an air flow brushing the joining portion 5 during the travel and, hence, generate vortices in the air flow upstream of the rear spoiler 6. The projecting aerodynamic elements 7 are aerodynamic vortex generators, which introduce, in the field of motion of the air flow brushing the joining portion 5, a concentrated vorticity, which, in turn, generates a downward vertical component in the speed field of the air flow downstream of the aerodynamic elements 7.

As a matter of fact, the air flowing on the joining portion 5 is caused to have a greater downward incidence due to the presence of the projecting aerodynamic elements 7 and this greater downward force of the air flow is capitalized by the rear spoiler 6, whose potentialities of generation of the force (namely, of the downforce) are increased.

In other words, thanks to the presence of the projecting aerodynamic elements 7, the downforce generated by the rear spoiler 6 can significantly be increased with a moderate increase in drag; as a consequence, the presence of the aerodynamic elements 7 allows the aerodynamic efficiency of the rear spoiler 6 to be increased to a remarkable extent.

In the embodiment shown in the accompanying figures, six aerodynamic elements 7 are provided, which are arranged in two rows with three aerodynamic elements 7 each; according to other embodiments which are not shown herein, the number, the arrangement and/or the shape of the aerodynamic elements 7 could be different.

Figure 4:
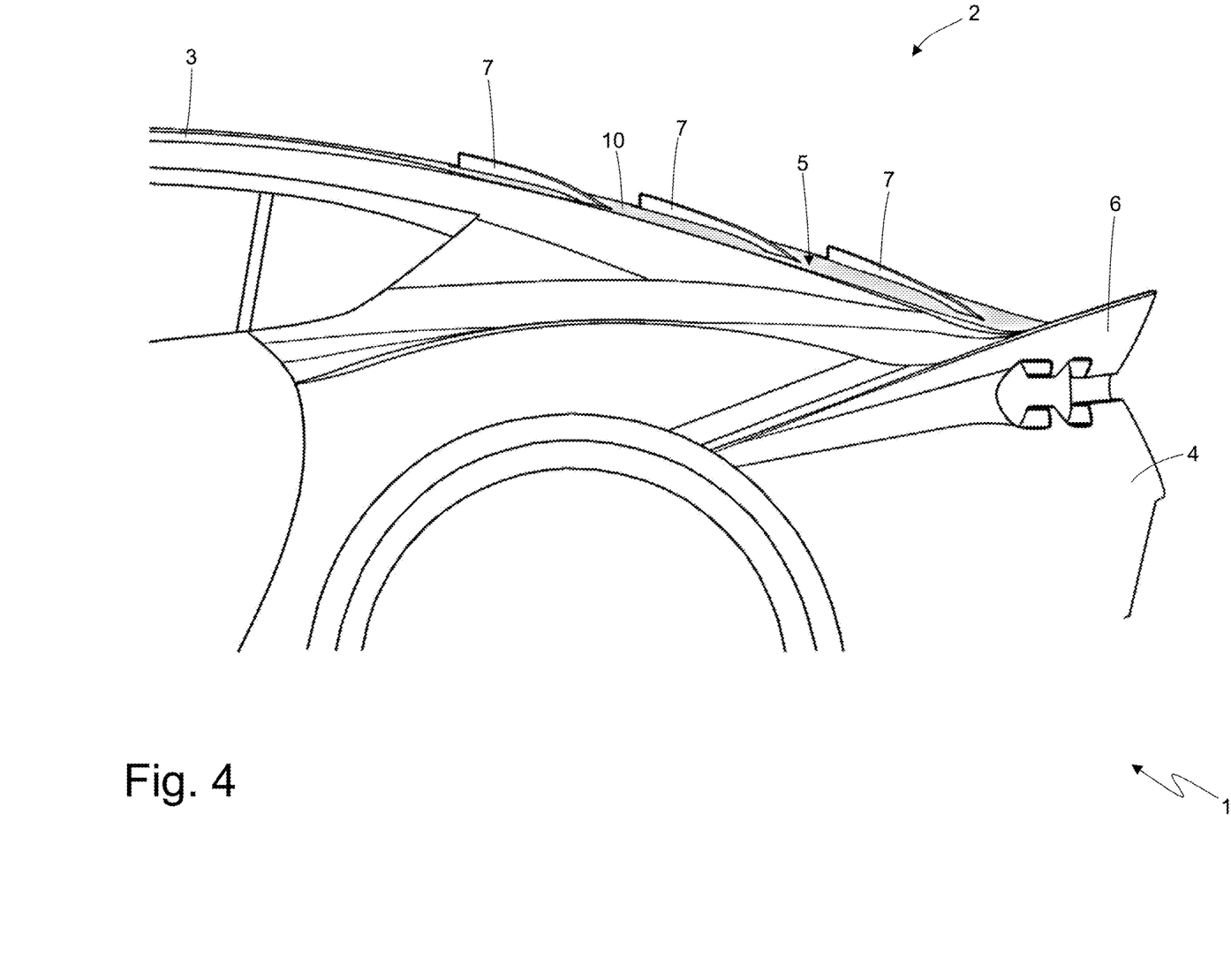
FIG. 4 is a side view of the rear part of the car of FIG. 1.
Figure 5:
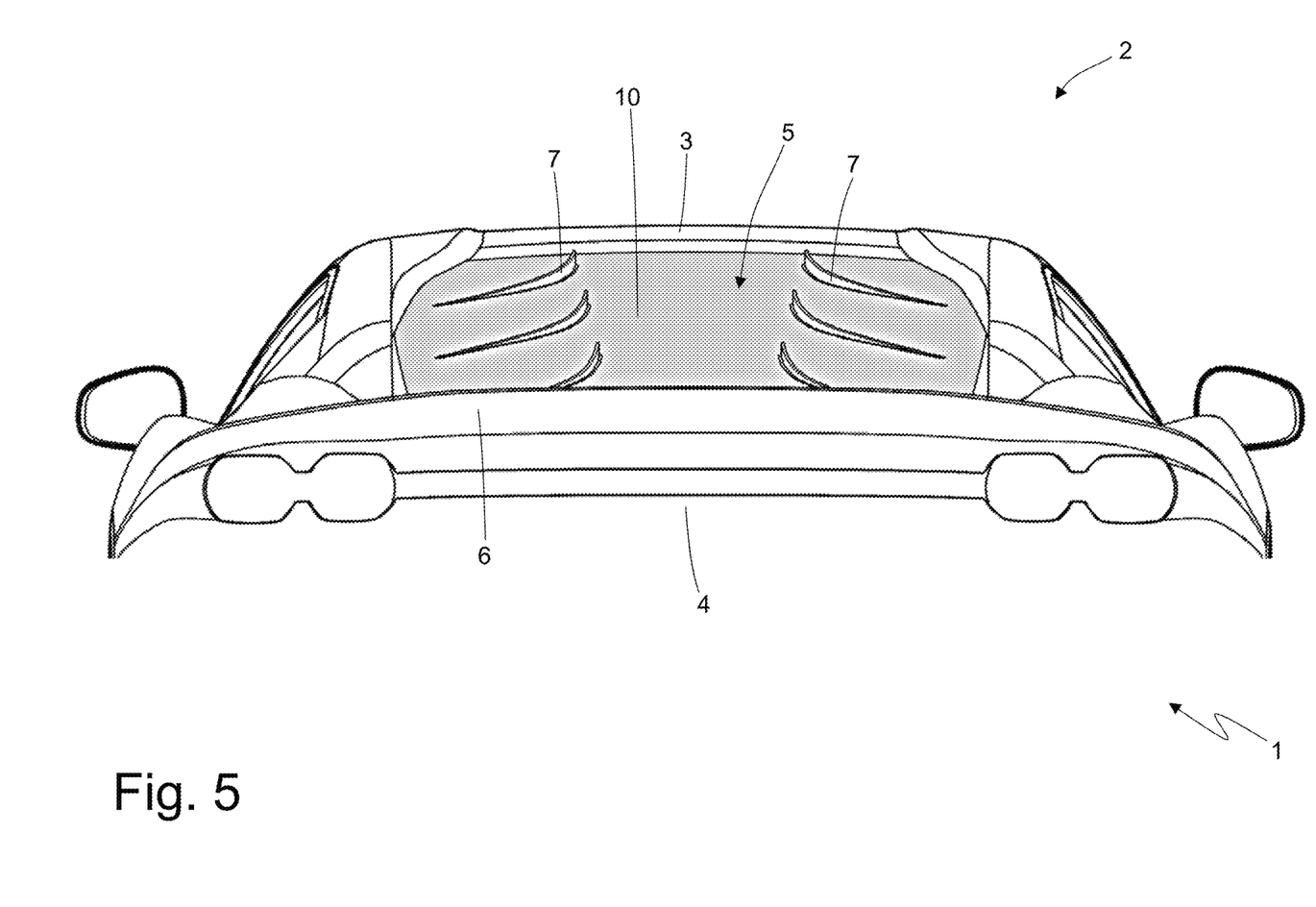
FIG. 5 is a rear view of the car of FIG. 1.

According to FIG. 4, each aerodynamic element 7 is vertically oriented and, hence, forms an acute angle with the joining portion 5 (which is inclined downwards).

Figure 2:
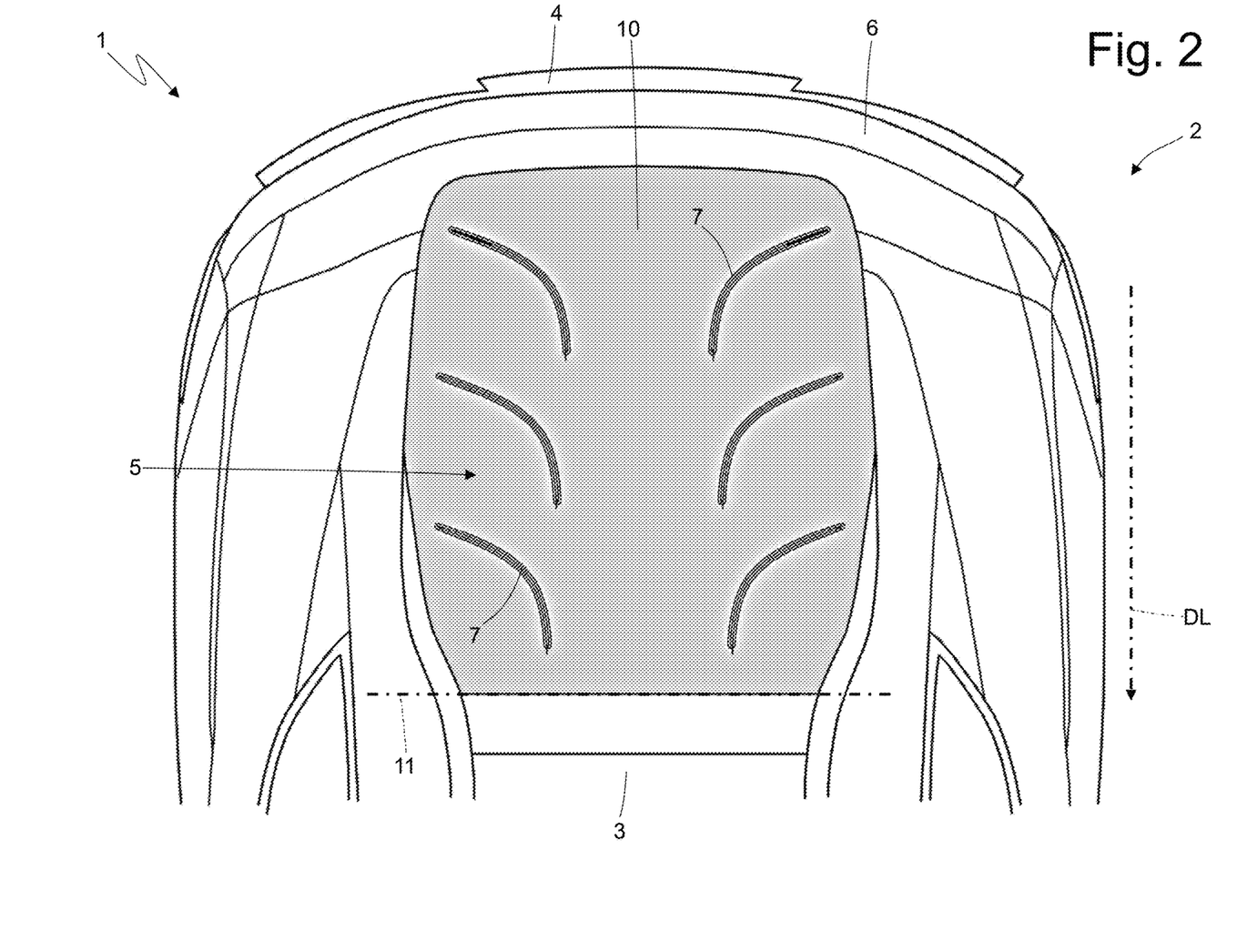
FIG. 2 is a plan view of the rear part of the car of FIG. 1.
Figure 3:
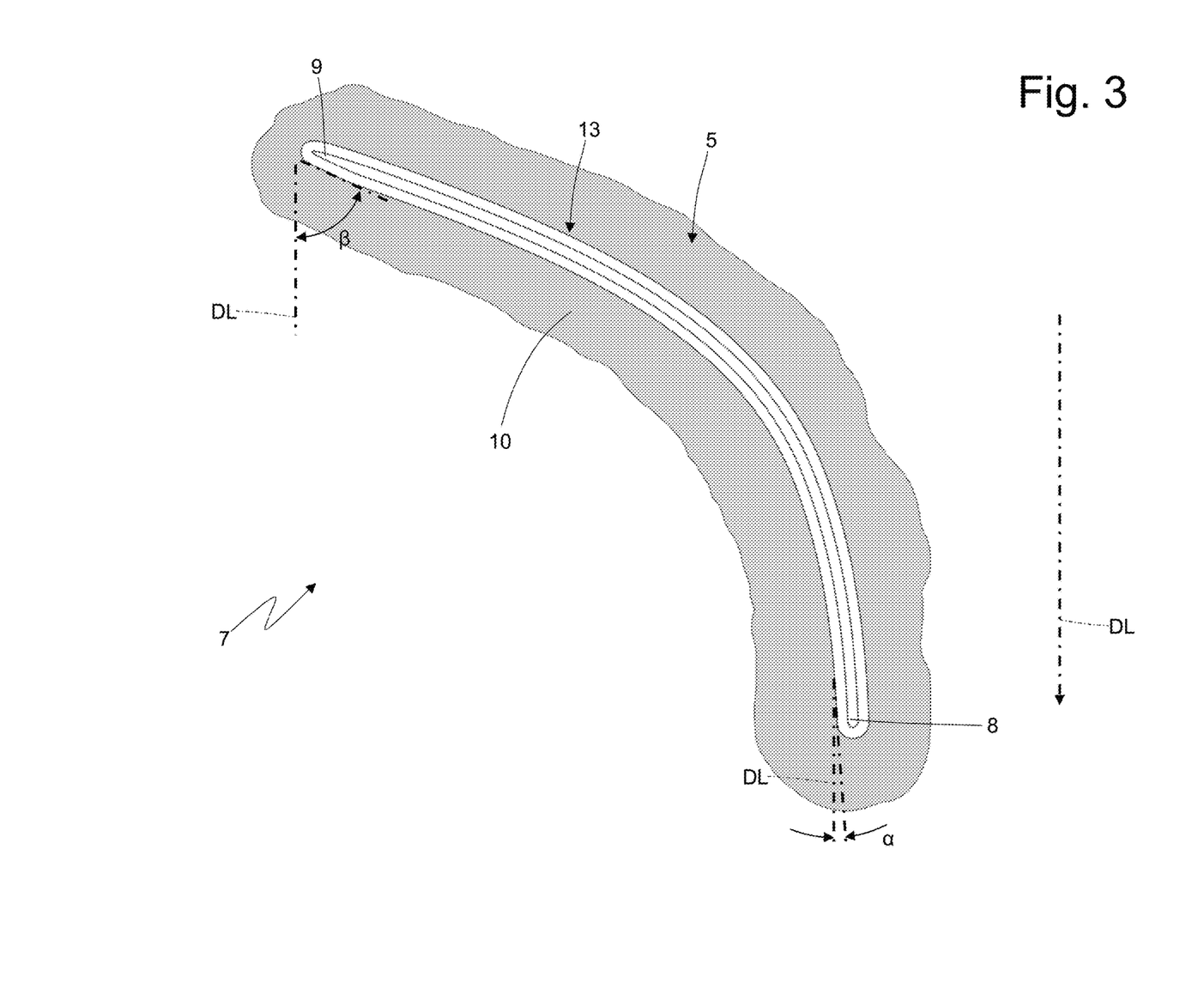
FIG. 3 is a view, on a larger scale, of a detail of FIG. 2.

According to FIGS. 2 and 3, each aerodynamic element 7 has, in plan view, a curved development and, has, in plan view, the shape of a "comma", namely of a "moustache".

According to FIG. 3, each aerodynamic element 7 has a front part 8 (namely, the first part of the aerodynamic element 7 that hits against the air flow) and a rear part 9 (namely, the last part of the aerodynamic element 7 brushed by the air flow); in other words, each aerodynamic element 7 extends from the front part 8 to the rear part 9.

Each aerodynamic element 7 forms, with a longitudinal direction DL, an angle progressively increasing from the front part 8 to the rear part 9. In particular, each aerodynamic element 7 has the front part 8 forming, with the longitudinal direction DL, a very small approach angle α and has the rear part 9 forming, with the longitudinal direction DL, a departure angle β significantly greater than the approach angle α. The approach angle α preferably ranges from 0° to 15° and the departure angle β preferably ranges from 30° to 75°. As a consequence, in each aerodynamic element 7, the front part 8 and the rear part 9 form, with one another, an obtuse angle.

Figure 6:
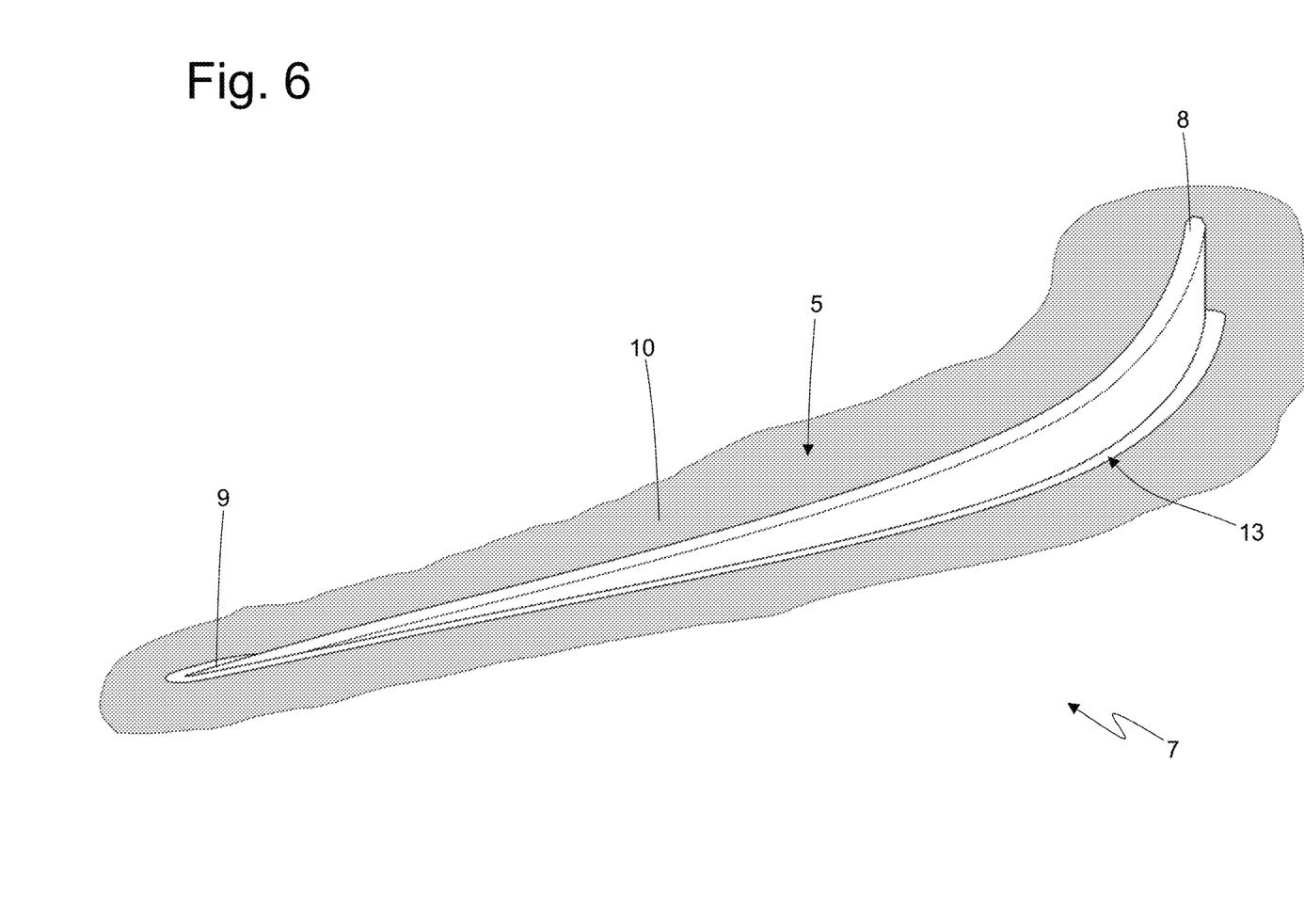
FIG. 6 is a view, on a larger scale, of a detail of FIG. 5.

According to FIG. 6, each aerodynamic element 7 has a vertical height progressively decreasing from the front part 8 to the rear part 9, namely the front part 8 projects from the joining portion 5 to a greater extent, whereas the rear part 9 projects from the joining portion 5 to a smaller extent, with a continuous and progressive reduction in the vertical height of the aerodynamic element 7. In the embodiments shown in the accompanying figures, the rear part of each aerodynamic element 7 has a vertical height basically equal to zero, namely each aerodynamic element 7 has a vertical height that progressively decreases from the front part 8 to the rear part 9, until it reaches a zero value at the end of the rear part 9. According to a preferred embodiment, in each aerodynamic element 7, a vertical height in the area of the front part 8 is at least three times a vertical height in the area of the rear part 9.

According to FIG. 2, the aerodynamic elements 7 are arranged in pairs, each consisting of two aerodynamic elements 7, which are transversely aligned with one another, are transversely spaced apart from one another and are oriented in a mirror-like opposite manner relative to one another (namely, the right aerodynamic element 7 faces right, whereas the left aerodynamic element 7 faces left). In the embodiment shown in the accompanying figures, three pairs of aerodynamic elements 7 are provided, which, hence, form two rows with three aerodynamic elements 7 each.

According to FIG. 2, the aerodynamic elements 7 are distributed in two rows, which are parallel to one another, develop longitudinally and have a transverse distance from one another other than zero, so that between the two rows there is a completely smooth central channel. The aerodynamic elements 7 of a same (right or left) row all have the same orientation and are mirror-like relative to the aerodynamic elements 7 of the other (left or right) row. Furthermore, each aerodynamic element 7 of a (right or left) row is arranged so as to be aligned with and next to an aerodynamic element 7 of the other (left or right) row with which it forms a pair.

According to a possible embodiment, for each aerodynamic element 7, the joining portion 5 has a corresponding depression ending in the area of the aerodynamic element 7. Namely, the joining portion 5 is recessed downwards upstream of an aerodynamic element 7 so as to form a depression (recess) ending in the area of the aerodynamic element 7.

Figure 7:
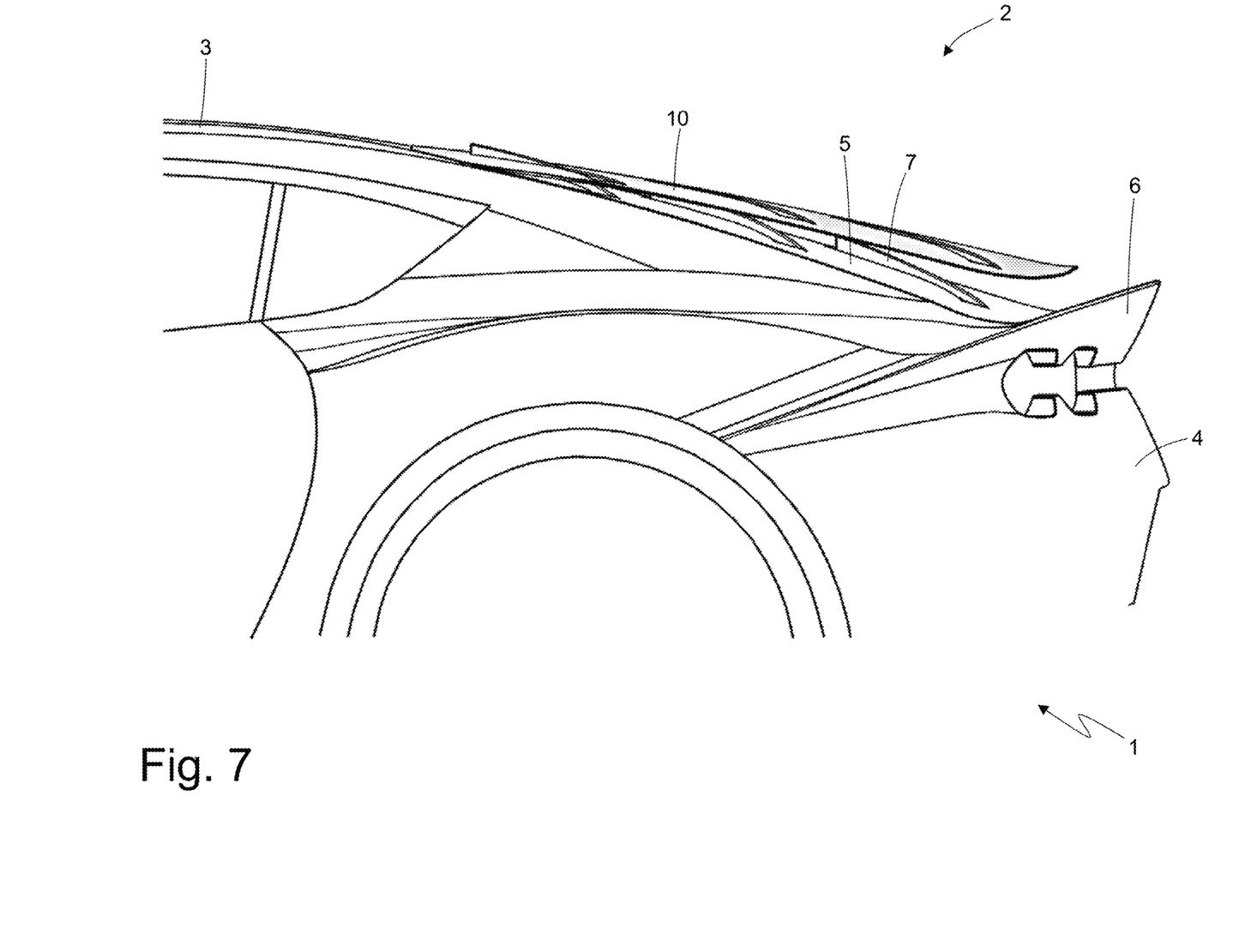
FIG. 7 is a side view of the rear part of the car of FIG. 1 with a deflector panel in a lifted position.
Figure 8:
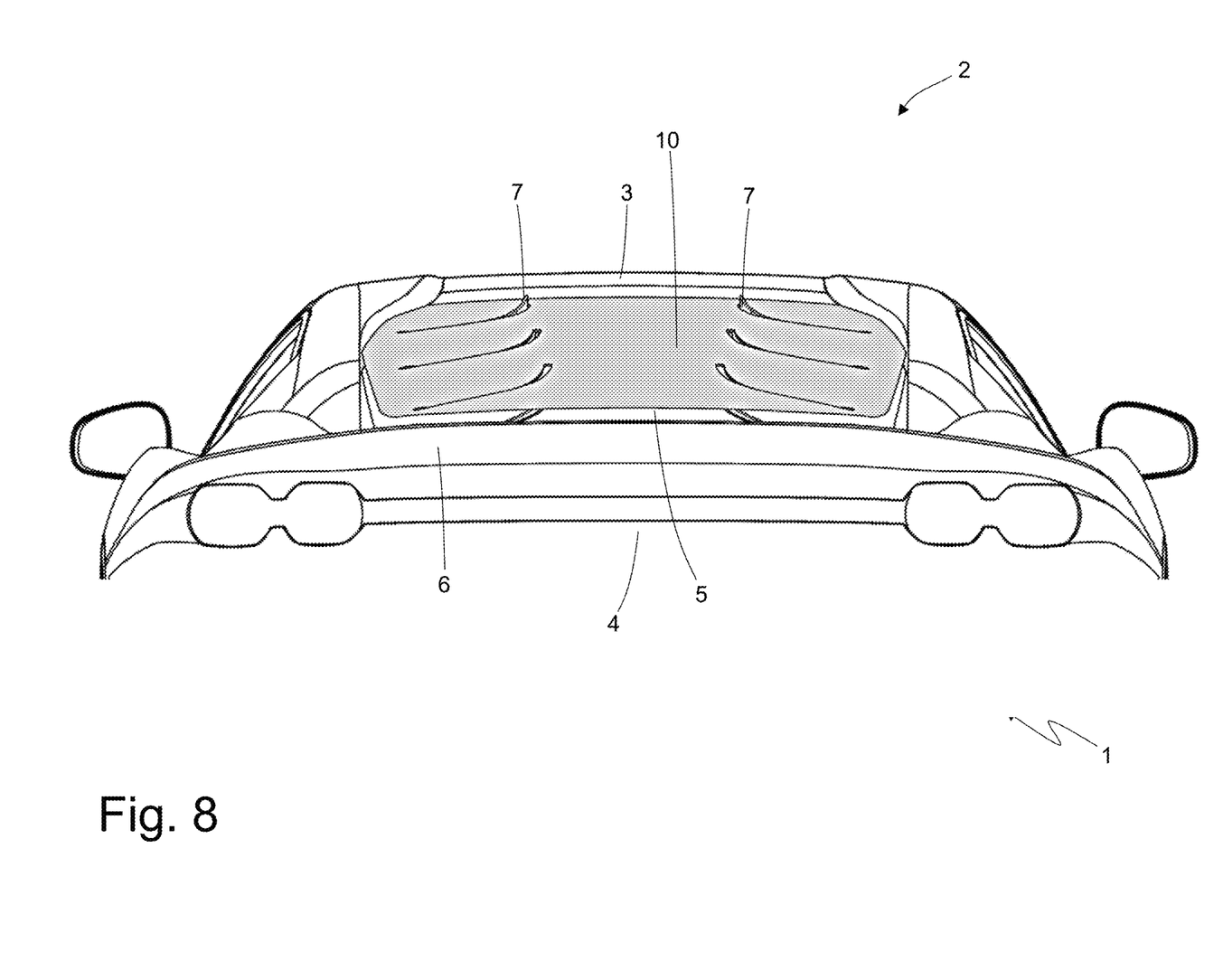
FIG. 8 is a rear view of the car of FIG. 1 with the deflector panel in the lifted position.

According to FIG. 1, a deflector panel 10 is provided, which is arranged on the joining portion 5, is directly hit by the air flow brushing the joining portion 5 during the travel (since it cover the joining portion 5 at the top) and is mounted in a movable manner so as to move between a rest position (shown in FIGS. 1-6), in which the deflector panel 10 rests on the joining portion 5, and an active position (shown in FIGS. 7-9), in which the deflector panel 10 is lifted and spaced apart from the joining portion 5.

Figure 9:
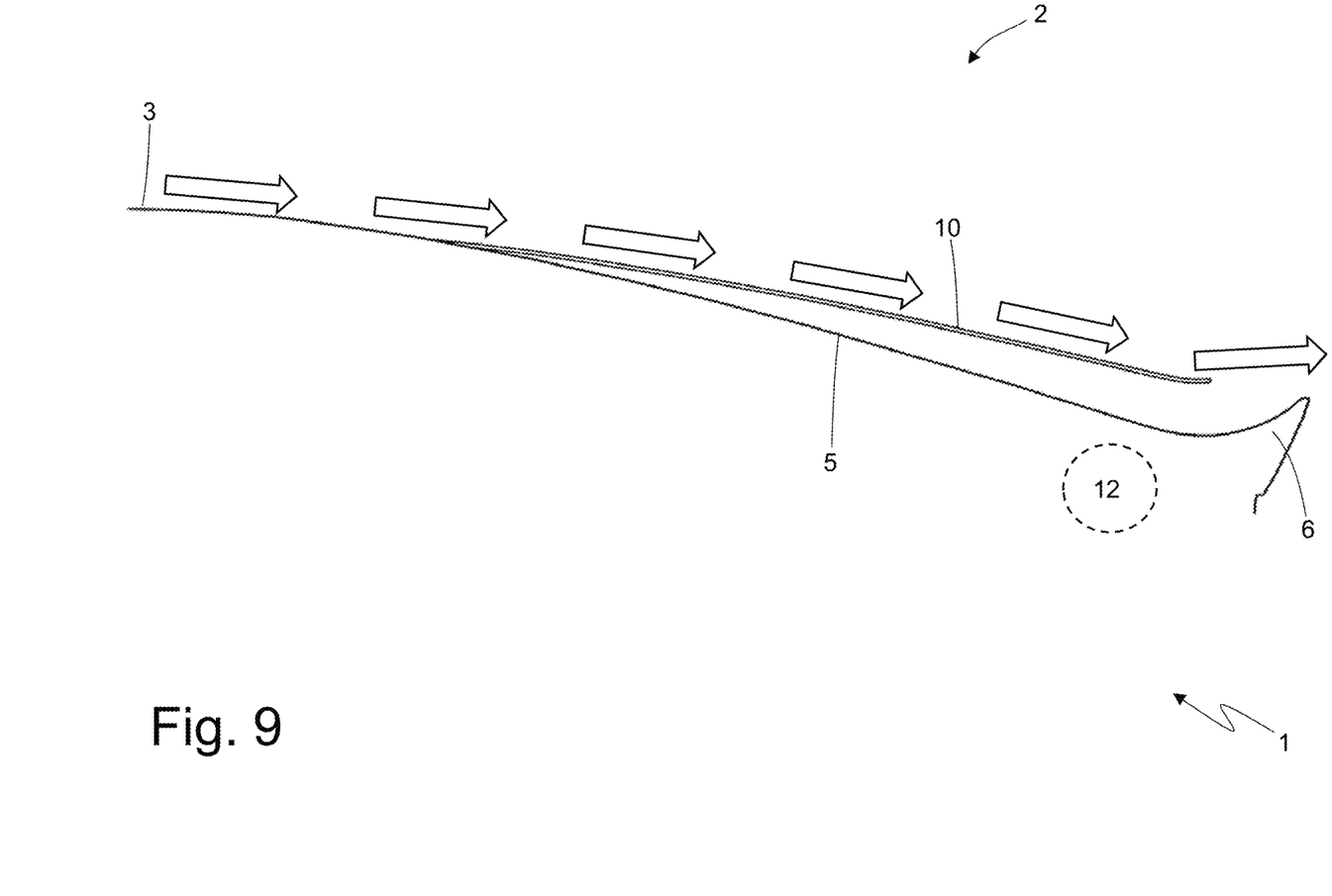
FIG. 9 is a schematic side view of the deflector panel in the lifted position.

According to FIG. 9, deflector panel 10 is shaped so as to deflect, when it is in the active position, the air flow above the rear spoiler 6 in order to aerodynamically cast a shadow on the rear spoiler 6. Namely, when the deflector panel 10 is in the active position, the air flow generated by the movement of the car 1 is pushed upwards by the deflector panel 10, thus entirely flowing above the rear spoiler 6, which, hence, is not hit by the air flow (therefore, the rear spoiler 6 generates a reduced downforce and also a moderate drag).

According to FIG. 4, the deflector panel 10 is shaped so as not to deflect, when it is in the rest position, the air flow above the rear spoiler 6 in order not to aerodynamically cast a shadow on the rear spoiler 6. Namely, when the deflector panel 10 is in the rest position, the air flow generated by the movement of the car 1 completely hits the rear spoiler 6 (hence, the rear spoiler 6 generates a great downforce and also a significant drag).

According to the preferred embodiment shown in the accompanying figures, the deflector panel 10 is hinged to the body 2 so as to rotate around a transverse rotation axis 11 (shown in FIG. 2), which is arranged in the area of a front edge of the deflector panel 10.

There is a mechanical actuator 12 (typically an electric motor schematically shown in FIG. 9), which acts upon the deflector panel 10 in order to move it from the rest position to the active position and vice versa.

Preferably, though not necessarily, the mechanical actuator 12 is designed to stop and hold the deflector panel 10 in a series of intermediate positions between the rest position and the active position.

A control unit is provided, which adjusts the position of the deflector panel 10 based on the needs resulting from the motion of the car 1: when a greater downforce (namely, a greater vertical force acting upon the rear wheels) is needed, the control unit moves the deflector panel 10 towards the rest position, whereas, when a greater drag (namely, a greater smoothness) is needed, the control unit moves the deflector panel 10 towards the active position.

According to a possible embodiment shown in the accompanying figures, the deflector panel 10 ends in the proximity of the rear spoiler 6 (close to the rear spoiler 6) so as to be capable of effectively deflecting the air flow generated by the movement of the car 1 above the rear spoiler 6.

According to a possible embodiment shown in the accompanying figures, a lower surface of the deflector panel 10 is shaped so as to reproduce in negative the shape of an upper surface of the joining portion 5 located under the deflector panel 10.

According to the embodiment shown in the accompanying figures, the deflector panel 10 also extends in the area of the aerodynamic elements 7, which are fixed to the underlying joining portion 5, and has, for each aerodynamic element 7, a corresponding through slit 13 (better visible in FIGS. 3 and 6) housing, on the inside, the aerodynamic element 7.

Namely, the deflector panel 10 has six through slits 13, each reproducing (with a certain clearance) shape and dimensions of a corresponding aerodynamic element 7 and crossed (with a certain clearance) by the corresponding aerodynamic element 7. As a consequence, the aerodynamic elements 7 are always still (since they are constrained to the joining portion 5) and do not move together with the deflector panel 10 (which does not touch the aerodynamic elements 7 thanks to the presence of the through slits 13). This embodiment allows for a further reduction of the drag when the deflector panel 10 is in the active position, since, besides aerodynamically casting a shadow on the rear spoiler 6, the deflector panel 10 (totally or partially) aerodynamically casts a shadow also on the aerodynamic elements 7 (according to FIG. 7).

According to a different embodiment which is not shown herein, the deflector panel 10 also extends in the area of the aerodynamic elements 7 and supports the aerodynamic elements 7; namely, the aerodynamic elements 7 are fixed to the deflector panel 10 and move together with the deflector panel 10.

According to a further embodiment which is not shown herein, the deflector panel 10 does not extend in the area of the aerodynamic elements 7 and, hence, extends only in the central channel between the aerodynamic elements 7.

In the preferred embodiment shown in the accompanying figures, there are both the aerodynamic elements 7 and the movable deflector panel 10. According to a further embodiment which is not shown herein, the sole movable deflector panel 10 is provided (namely, there are no aerodynamic elements 7). According to a further embodiment which is not shown herein, the sole aerodynamic elements 7 are provided (namely, there is no movable deflector panel 10).

The embodiments described herein can be combined with one another, without for this reason going beyond the scope of protection of the invention.

The car 1 described above has numerous advantages.

First of all, thanks to the presence of the aerodynamic elements 7 in the car 1 described above, the rear spoiler 6 has a high aerodynamic efficiency, namely a high ratio between the downforce generated by the rear spoiler 6 and the corresponding drag generated by the rear spoiler 6.

Furthermore, thanks to the presence of the movable deflector panel 10 in the car 1 described above, a shadow can aerodynamically be cast on the rear spoiler 6 (which is completely fixed, namely completely free from moving parts) in order to reduce the drag generated by the rear spoiler 6 when a great downforce does not need to be generated in the area of the rear wheels.

Finally, the car 1 described above is simple and economic to be manufactured as the aerodynamic elements 7 are appendages that can simply be applied to the joining portion 5 and since the deflector panel 10, for it has an extremely small stroke, can easily be driven by a motor.

LIST OF THE REFERENCE NUMBERS OF THE FIGURES 1 car
2 body
3 roof
4 tail
5 joining portion
6 rear spoiler
7 aerodynamic elements
8 front part
9 rear part
10 deflector panel
11 rotation axis
12 mechanical actuator
13 through slit

The invention claimed is:

1. A car (1) comprising:
a passenger compartment;
a body (2) surrounding the passenger compartment and having: a roof (3), a tail (4) provided with a rear bumper, and a joining portion (5) connecting the roof (3) to the tail (4);
a rear spoiler (6), which is arranged at the end of the joining portion (5) in the area of the tail (4); and
a plurality of projecting aerodynamic elements (7) protruding from the joining portion (5) in order to intercept an air flow brushing the joining portion (5) during the travel and, hence, generate vortices in the air flow upstream of the rear spoiler (6);
wherein each aerodynamic element (7) has, in plan view, a curved development, has a front part (8) forming, with a longitudinal direction (DL), an approach angle ($\alpha$) and has a rear part (9) forming, with the longitudinal direction (DL), a departure angle ($\beta$) greater than the approach angle ($\alpha$).

2. The car (1) according to claim 1, wherein each aerodynamic element (7) is oriented vertically and forms an acute angle with the joining portion (5).

3. The car (1) according to claim 1, wherein each aerodynamic element (7) forms, with the longitudinal direction (DL), an angle progressively increasing from the front part (8) to the rear part (9).

4. The car (1) according to claim 1, wherein the approach angle (α) ranges from 0° to 15°.

5. The car (1) according to claim 1, wherein the departure angle (β) ranges from 30° to 75°.

6. The car (1) according to claim 1, wherein each aerodynamic element (7) has a vertical height progressively decreasing from the front part (8) to the rear part (9).

7. The car (1) according to claim 1, wherein, in each aerodynamic element (7), the front part (8) and the rear part (9) form, with one another, an obtuse angle.

8. The car (1) according to claim 1, wherein each aerodynamic element (7) has, in plain view, the shape of a "comma" or of a "moustache".

9. The car (1) according to claim 1, wherein the aerodynamic elements (7) are arranged in pairs, each consisting of two aerodynamic elements (7), which are transversely aligned with one another, are transversely spaced apart from one another and are oriented in a mirror-like opposite manner relative to one another.

10. The car (1) according to claim 1, wherein the aerodynamic elements (7) are distributed in two rows, which are parallel to one another, develop longitudinally and have a transverse distance from one another other than zero, so that between the two rows there is a completely smooth central channel.

11. The car (1) according to claim 10, wherein:
the aerodynamic elements (7) of a same row all have the same orientation and are mirror-like relative to the aerodynamic elements (7) of the other row; and
each aerodynamic element (7) of a row is aligned with and is arranged next to an aerodynamic element (7) of the other row.

12. The car (1) according to claim 1, wherein, for each aerodynamic element (7), the joining portion (5) has a corresponding depression ending in the area of the aerodynamic element (7).

13. The car (1) according to claim 1 and comprising a deflector panel (10), which is arranged on the joining portion (5), is directly hit by the air flow brushing the joining portion (5) during the travel and is mounted in a movable manner so as to move between a rest position, in which the deflector panel (10) rests on the joining portion (5), and an active position, in which the deflector panel (10) is lifted and spaced apart from the joining portion (5).

14. The car (1) according to claim 13, wherein the deflector panel (10) also extends in the area of the aerodynamic elements (7) and supports the aerodynamic elements (7).

15. The car (1) according to claim 13, wherein the deflector panel (10) also extends in the area of the aerodynamic elements (7), which are fixed to the underlying joining portion (5), and has, for each aerodynamic element (7), a corresponding through slit (13) housing, on the inside, the aerodynamic element (7).

* * * * *